United States Patent [19]

van der Schoot

[11] 4,086,998

[45] May 2, 1978

[54] ARTICLE GRADER

[75] Inventor: Jelle van der Schoot, Aalten, Netherlands

[73] Assignee: Staalkat B.V., Aalten, Netherlands

[21] Appl. No.: 732,375

[22] Filed: Oct. 14, 1976

[51] Int. Cl.² .......................................... B65G 43/08
[52] U.S. Cl. ................................. 198/358; 198/437; 198/573; 198/856; 53/59 R; 53/59 W
[58] Field of Search ............... 198/358, 469, 573, 577, 198/856, 855; 53/59 R, 59 W

[56] References Cited

U.S. PATENT DOCUMENTS

| | | | |
|---|---|---|---|
| 2,961,087 | 11/1960 | Reading | 198/484 X |
| 3,822,009 | 7/1974 | Richards | 198/444 |
| 3,929,218 | 12/1975 | Risley | 198/577 X |
| 3,998,319 | 12/1976 | Mernoe | 198/577 |
| 4,023,669 | 5/1977 | Clarke | 198/573 |

*Primary Examiner*—Travis S. McGehee
*Attorney, Agent, or Firm*—Cushman, Darby & Cushman

[57] ABSTRACT

An article grader essentially comprising a feed belt for the articles, a device for simultaneously weighing a number of articles fed by the feed belt, a conveyor for conveying the weighed articles to a plurality of accumulation belts, each designed for receiving the articles of a specific class of weight, and arranged behind each accumulation belt a feed equalizer, a packing machine and a closing device. Besides there are provided means for controlling the feed rate in dependence of the quantity of articles present on each of the accumulation belts.

2 Claims, 5 Drawing Figures

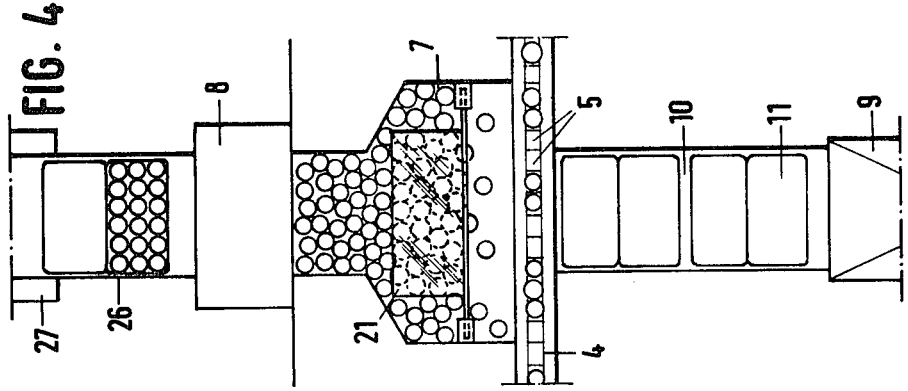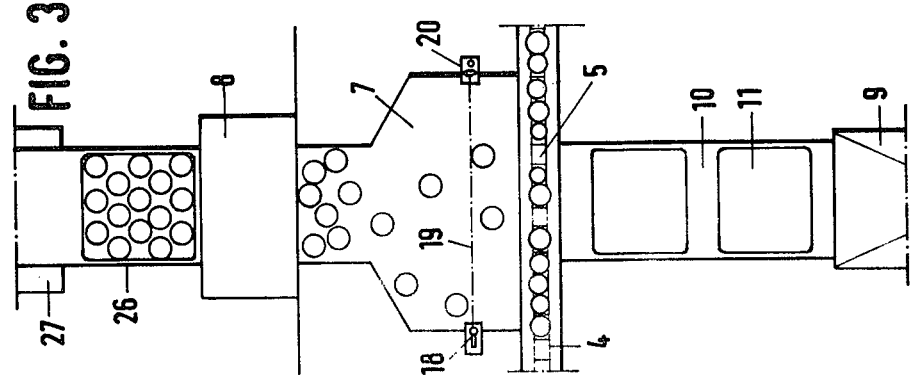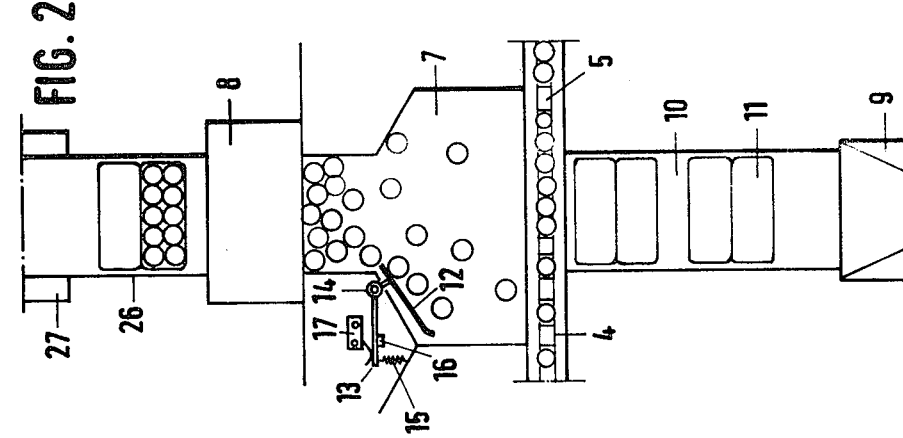

ARTICLE GRADER

This invention relates to an article grader, essentially comprising a feed belt for the articles, a device for simultaneously weighing a plurality of articles fed by the feed belt, a conveyor for conveying the weighed articles to a plurality of accumulation belts, each designed for receiving the articles of a specific class of weight, and arranged behind each accumulation belt a feed equalizer, a packing machine and a closing device.

Apparatus of this type is often used for grading eggs by their weight and packing them. The articles fed, in this instance eggs, will not be evenly distributed over the various classes of weight, however, but usually be distributed according to a Gaussian curve. The peak of this curve will fluctuate depending on the group of hens which have laid the eggs. It is clear that in this situation, at a certain speed of the conveyor, in certain grading lines, comprising an accumulator, a feed equalizer, a packing machine and closing device, the accumulation belt may become overloaded. If this threatens to be the case the entire apparatus must be stopped. Of course, this results in great loss of production.

The object of the invention is to reduce said loss of production as much as possible.

To this end the article grader is characterized by means for controlling the feed rate in dependence of the quantity of articles present on each of the accumulation belts. As a consequence, the apparatus need not be stopped completely, but its speed can be reduced temporarily, so that the loss of production is considerably less than in the case where the apparatus is completely stopped.

Said means can be formed by a retaining plate disposed adjacent to one of the boundary walls of each accumulation belt, which plate, by means of a spring-loaded lever, can operate a switch, by means of which the drive motor of the apparatus can be controlled.

Said means can also be formed by a light source and a detector disposed adjacent each accumulation belt, which can control the drive motor of the apparatus by means of a time relay to be set.

Still another solution is formed in that said means include a plate which is pivotally hung above accumulation belt, said plate being adapted to control the drive motor of the apparatus by means of a switch.

Said means may also comprise a counter provided for each grading glass, for counting the number of articles accumulating on the accumulation belt, which counter can control the drive motor of the apparatus.

In a further embodiment of the invention said means can control the conveyor drive motor and the conveyor can be mechanically connected to the feed belt.

This invention will now be elucidated in more detail with reference to the accompanying drawings showing a few embodiments of the egg grader by way of example. In said drawings, FIG. 1 is a schematic plan view of a first embodiment of the egg grader according to the invention;

FIG. 2 shows on an enlarged scale a detail of the apparatus shown in FIG. 1;

FIG. 3 is a view in accordance with FIG. 2 of another embodiment;

FIG. 4 is a view in accordance with FIG. 2 of still another embodiment and

Figure 1:
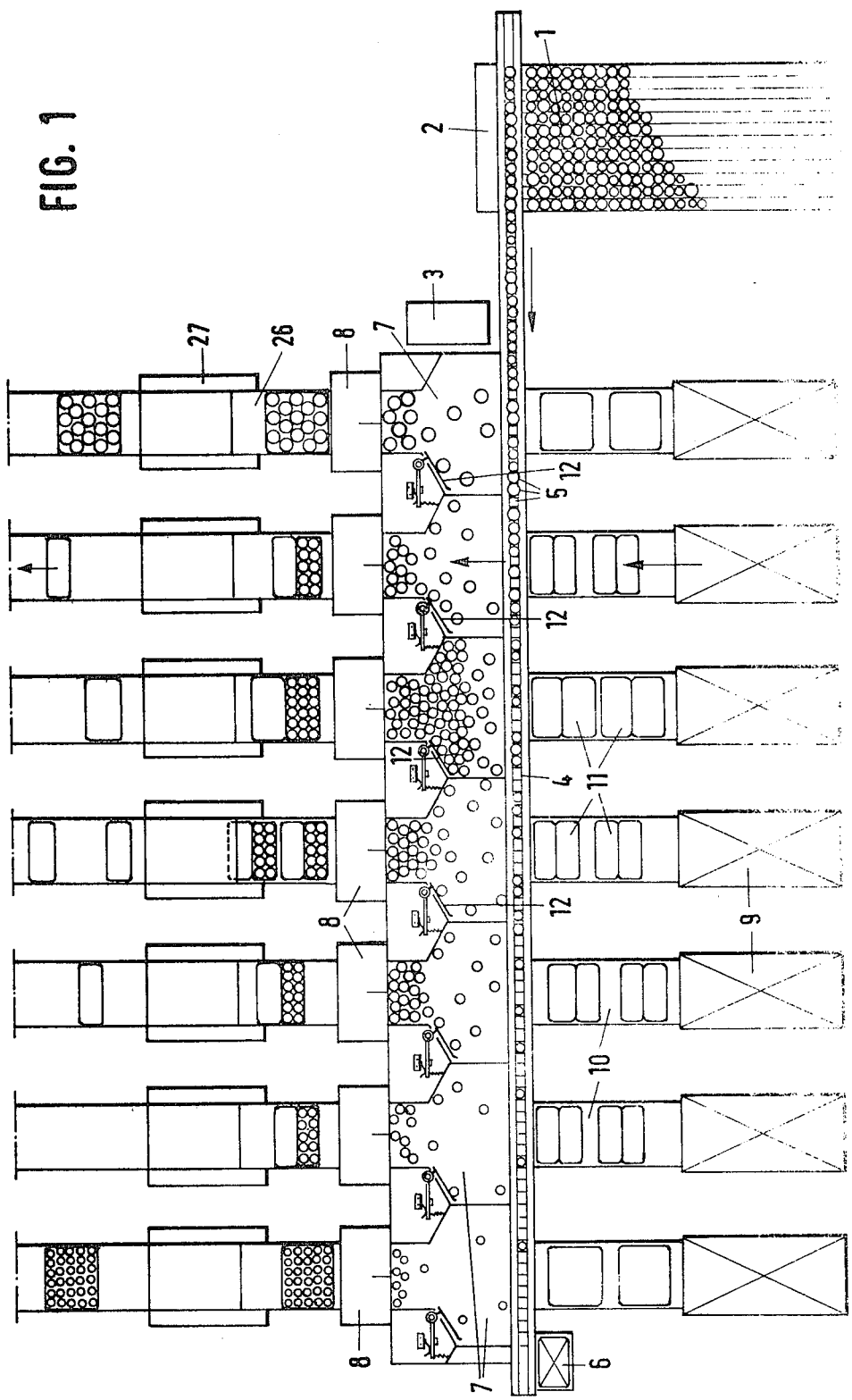

As shown in FIG. 1, an egg grader comprises a feed belt, for instance a roller conveyor 1 via which eggs to be graded are fed to a weighing unit 2. This weighing unit comprises a plurality of balances, in this instance twelve, as is described in U.S. application Ser. No. 620,044 now U.S. Pat. 3,980,147. The results of these gradings are stored in a memory 3, the information of which moves along with a chain 4 to which carriers 5 are attached, as is described in Dutch patent application No. 75,13631 corresponding to U.S. Application Ser. No. 742,248. The transfer of the eggs from the balance to the carriers can take place by means of a transfer mechanism, as is described in Dutch patent application No. 76,04272, filed in the Netherlands Apr. 22, 1976 and corresponding to U.S. Application Ser. No. 788,922, filed Apr. 19, 1977.

The chain with carriers, intermittently driven by a motor 6, moves the eggs past a plurality of accumulation belts 7, seven in the embodiment shown, each forming part of a packing line for a certain weight class of eggs. Adjacent each accumulation belt there are twelve stop means, corresponding with the number of balances, operable by means of a magnet coil (see the aforementioned U.S. Application Ser. No. 742,248). The energization of the magnet coil is effected by means of the above-mentioned memory, the information of which moves together with the belt. Upon operation of the said stop means the corresponding egg carrier is opened, so that the egg is released and arrives at an accumulation belt 7. By means of the acumulation belt the eggs are subsequently fed to a feed equalizer and packing machine 8, as is described in U.S. Pat. No. 3,874,494 and U.S. application Ser. No. 478,069 now U.S. Pat. No. 3,973,667. During packing the eggs are introduced in trays 11. The filled trays then pass by means of a conveyor belt 26, which can form part of conveyor belt 10, a closing device 27, as is described in the U.S. patent and are then ready for transport to the consumer.

From a de-nester 9, as is described in U.S. Pat. No. 3,341,072, trays 11 are supplied to the packing machine by means of a conveyor belt 10 intermittently moved below transport chain 4, accumulation belt 7 and the feed equalizer.

If the number of eggs fed to one single accumulation belt becomes too great, as illustrated in the accumulation belt shown in FIG. 1 as the third from the right, accumulation and hence fracture of eggs would result on this belt if no steps would be taken. To prevent this, a retaining plate 12 is arranged adjacent to one of the walls defining the accumulation belt. The walls of each accumulation belt define an inlet having a given width and a discharge end having a width that is less than the inlet width while the walls, against one of which the retaining plate is located, define a narrowing portion disposed between the inlet and discharge end. The narrowing portion walls extend at an angle relative to the direction of article movement on each accumulation belt. Thrust plate 12 is secured to a lever 13 (FIG. 2) and is pivotable about a pivot 14 together with said lever. By means of a spring 15 the lever is drawn against a stop means 16. If, as a result of the great number of eggs on accumulation belt 7 the retaining plate is moved against the action of spring 15, lever 13 operates a microswitch 17. This switch subsequently applies a signal to motor 6, so that its speed and hence the total working capacity is reduced. During this reduced working capacity the great quantity of eggs on the respective accumulator belt can be dealt with. Said motor can be a thyristor-controlled motor, but also a mechanical variator controlled by a servomotor, or a different type of electrical system.

When the surplus of eggs on the respective accumulator belt 7 is cleared, spring 15 will unload microswitch 17 again, thus allowing chain 4 to assume its original speed again.

Another possibility to achieve the object contemplated is shown in FIG. 3, in which on one side above accumulator belt 7 there is arranged a light source 18 emitting a light beam 19, which can be caught by a detector 20. In case the detector remains dark too long, indicating that there are too many eggs on the respective accumulator belt, motor 6 is operated in the manner described above by means of a time relay to be adjusted (not shown).

Still another possibility is shown in FIG. 4. In this embodiment a horizontally pivotating plate 21 of very light material is arranged above accumulator belt 7, which moves upwardly upon accumulation of the eggs and can operate motor 5 via a switch (not shown).

As appears from the foregoing, many solutions are possible, all of which come under the scope of the present invention, namely, in case of a surplus of eggs on the accumulator belt, to operate the entire apparatus at a reduced speed but not stop it, thus avoiding a very great loss of production.

Figure 5:
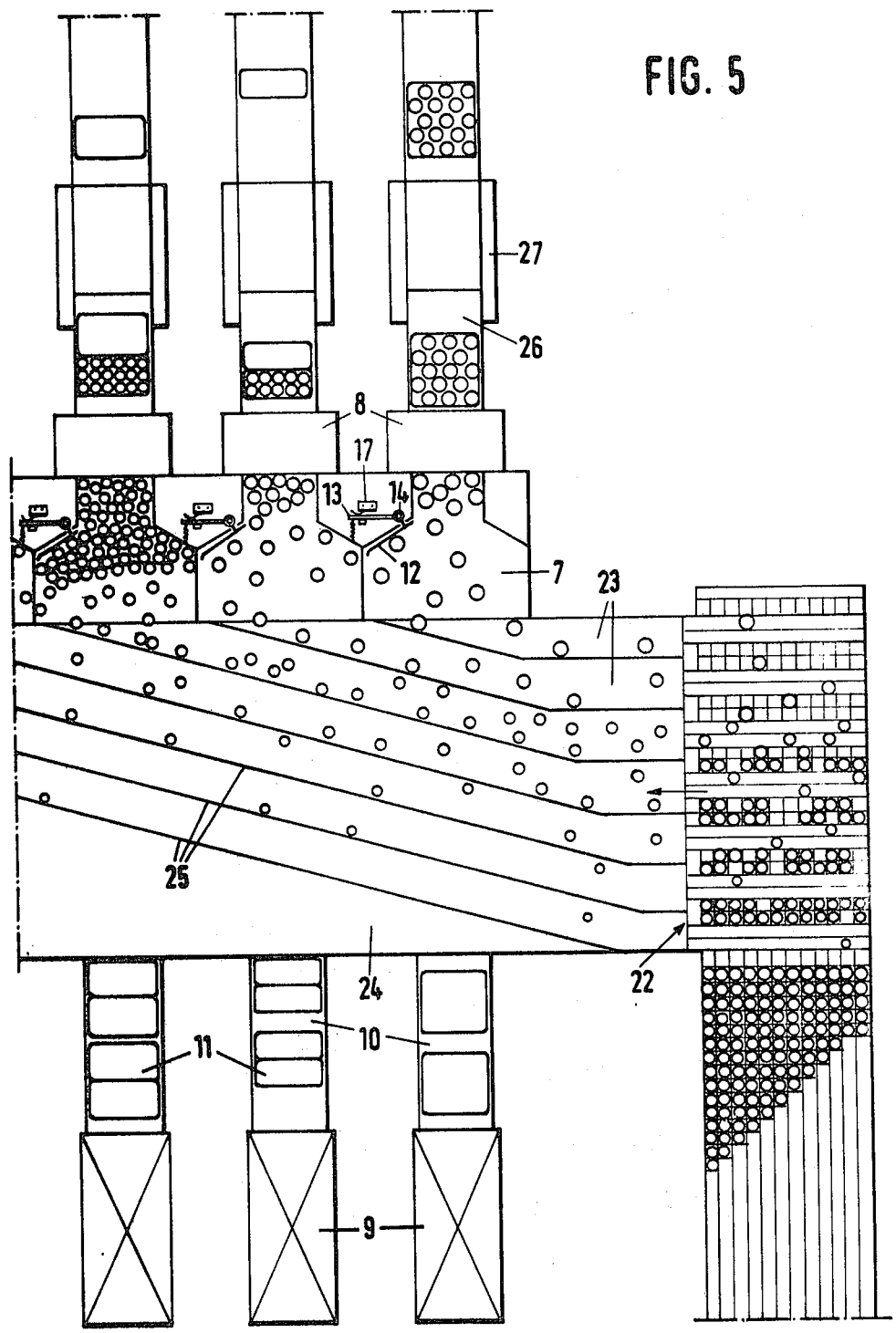
FIG. 5 is a view in accordance with FIG. 1 of yet another embodiment.

Furthermore it will be clear that the invention is not limited to the egg grader shown in FIG. 1, but can also be used, for example, in the egg grader shown in FIG. 5, in which for the same parts the same reference numerals have been used. The latter differs from the apparatus shown in FIG. 1 in that instead of weighing unit 2 use is made of a mechanical weighing system 22, as is described in U.S. Pat. Nos. 3,426,894 and 3,504,791, wherein the eggs are divided out as to class (in this instance seven) immediately after weighing and are conveyed to the several accumulation belts 7 via tracks 23 formed by strips 25 provided above a wide conveyor belt 24. This does not require a memory, it is true, but total transport through the apparatus makes the eggs much more liable to breakage.

I claim:

1. In an article grader of the type including weighing means for controlling distribution of the articles from a conveyor means to a plurality of accumulation belts and a drive motor for driving said conveyor means, the improvement comprising means for controlling the speed of said drive motor in relation to the quantity of articles present on each of said accumulation belts, each said accumulation belt having walls defining an inlet having a given width, a discharge end having a width that is less than said given width and narrowing wall portions located between said inlet and discharge end which extend at an angle relative to the direction of article movement on each accumulation belt, said means for controlling including a plurality of switch means movable between an on and off position to activate and de-activate, respectively, said drive motor, a plurality of plate members, a like plurality of mounting means for movably mounting a said plate member adjacent to one of said narrowing wall portions of each said accumulation belt so that articles accumulating on a said accumulation belt will contact and move the associated plate member, means for transmitting the movement of a said plate member to a said switch means associated therewith to move said associated switch means between its said on and off positions.

2. In an article grader of the type including weighing means for controlling distribution of the articles from a conveyor means to a plurality of accumulation belts and a drive motor for driving said conveyor means, the improvement comprising means for controlling the speed of said drive motor in relation to the quantity of articles present on each of said accumulation belts, each said accumulation belt having walls defining an inlet having a given width, a discharge end having a width that is less than said given width and narrowing wall portions located between said inlet and discharge end which extend at an angle relative to the direction of article movement on each accumulation belt, said means for controlling including a plurality of switch means movable between an on and off position to activate and de-activate, respectively, said drive motor, a plurality of plate members, a like plurality of mounting means for movably mounting a said plate member adjacent each said inlet of each said accumulation belt so that articles accumulating on a said accumulation belt will contact and move the associated plate member about a horizontal axis, means for transmitting the movement of a said plate member to a said switch means associated therewith to move said associated switch means between its said on and off positions.

* * * * *